United States Patent
Baalbaki et al.

(10) Patent No.: US 10,669,204 B2
(45) Date of Patent: Jun. 2, 2020

(54) CONCRETE COMPOSITION

(71) Applicant: Holcim Technology Ltd., Jona (CH)

(72) Inventors: Moussa Baalbaki, Möriken (CH); Bill Gong, Ontario (CA); David Babayan, Aarau Rohr (CH); Winnie Matthes, Aarau (CH)

(73) Assignee: Holcim Technology Ltd., Jona (CH)

( * ) Notice: Subject to any disclaimer, the term of this patent is extended or adjusted under 35 U.S.C. 154(b) by 136 days.

(21) Appl. No.: 15/573,999

(22) PCT Filed: May 12, 2016

(86) PCT No.: PCT/IB2016/000636
§ 371 (c)(1),
(2) Date: Nov. 14, 2017

(87) PCT Pub. No.: WO2016/185264
PCT Pub. Date: Nov. 24, 2016

(65) Prior Publication Data
US 2018/0290926 A1 Oct. 11, 2018

(30) Foreign Application Priority Data
May 15, 2015 (AT) .................................. A 310/2015

(51) Int. Cl.
C04B 28/04 (2006.01)
C04B 40/00 (2006.01)
(Continued)

(52) U.S. Cl.
CPC .............. *C04B 28/04* (2013.01); *C04B 14/06* (2013.01); *C04B 22/064* (2013.01); *C04B 24/32* (2013.01);
(Continued)

(58) Field of Classification Search
None
See application file for complete search history.

(56) References Cited

U.S. PATENT DOCUMENTS

| 4,205,994 A | 6/1980 | Moyer, Jr. et al. |
| 2006/0144299 A1 | 7/2006 | Takada et al. |

(Continued)

FOREIGN PATENT DOCUMENTS

| CN | 102807349 A | * 12/2012 | ............. C04B 38/02 |
| EP | 1627864 A1 | 2/2006 | |

(Continued)

OTHER PUBLICATIONS

CN-102807349-A, Dec. 2012, Derwent AB.*
(Continued)

*Primary Examiner* — Satya B Sastri
(74) *Attorney, Agent, or Firm* — Fitch, Even, Tabin & Flannery, LLP

(57) ABSTRACT

A concrete composition having, in a mixture with water, a hydraulic binder, sand, aggregates, an expanding agent and a shrinkage reducing admixture, wherein the expanding agent is calcium oxide having a low reactivity such that the concrete casted using the composition does not expand by more than 0.05 vol. % during the first 10 days, preferably not expanding more than 0.05 vol. % during the first 7 days, after having been cast.

17 Claims, 2 Drawing Sheets

Figure 1:
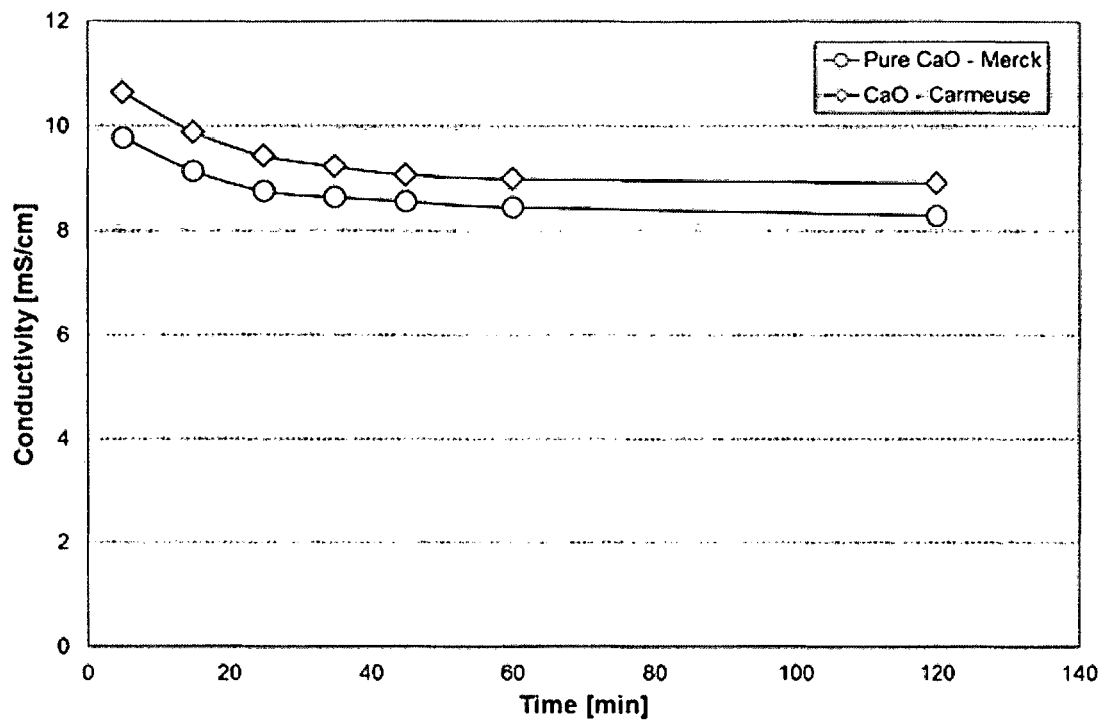

(51) Int. Cl.
*C04B 14/06* (2006.01)
*C04B 22/06* (2006.01)
*C04B 24/32* (2006.01)
*C04B 111/34* (2006.01)

(52) U.S. Cl.
CPC ..... *C04B 40/0042* (2013.01); *C04B 2111/346* (2013.01)

(56) References Cited

U.S. PATENT DOCUMENTS

2008/0087199 A1 4/2008 Gartner
2009/0305019 A1* 12/2009 Chanvillard .......... C04B 22/008
  428/220
2012/0021206 A1 1/2012 Oslefs et al.

FOREIGN PATENT DOCUMENTS

| | | |
|---|---|---|
| FR | 2912130 A1 | 8/2008 |
| JP | 2002348158 A | 12/2002 |
| JP | 2010155741 A | 7/2010 |
| WO | 2011053103 A2 | 5/2011 |
| WO | 2014080368 A1 | 5/2014 |

OTHER PUBLICATIONS

International Search Report for PCT/IB2016/000636 dated Oct. 13, 2016 submitted herewith (7 pages).
Written Opinion of the International Searching Authority (English) for PCT/IB2016/000636, 10 pages.
Maltese et al., Combined Effect of expansive and shrinkage reducing admixtures to obtain stable and durable mortars, Cement and Concrete Research 35:244-2251 (2005).

* cited by examiner

CONCRETE COMPOSITION

CROSS-REFERENCE TO RELATED APPLICATIONS

This application is the U.S. national phase application filed under 35 U.S.C. § 371 of International Application No. PCT/IB2016/000636, filed May 12, 2016, designating the United States, and claims priority from Austrian Patent Application No. A 310/2015, filed May 15, 2015, and the complete disclosures of which applications are hereby incorporated herein by reference in their entirety for all purposes.

The invention refers to a concrete composition comprising, in a mixture with water, a hydraulic binder, sand, aggregates, an expanding agent and a shrinkage reducing admixture.

Further, the invention refers to a hydraulic binder composition for producing a very low-shrinkage concrete, comprising ordinary Portland cement, optionally a supplementary cementitious material and an expanding agent.

Concrete is a very widely used construction material with high strength and good durability. In addition to aggregates and water, it also contains Portland cement as a hydraulic binder, which produces strength-forming phases by solidifying and curing in contact with water. Concrete based on Portland cement clinker is thus one of the most important binders worldwide.

When Portland cement formulations are mixed with water, they immediately begin hydration reactions that generate heat and cause a cement matrix formation. Once set, concrete experiences shrinkage which in turn generates mechanical stress in the structure. If this stress is higher than the tensile strength of concrete, cracks develop.

From its initial placing and throughout its service life, concrete goes through a series of mechanisms that will cause shrinkage. Shrinkage mechanisms in concrete can be classified as follows: Plastic Shrinkage, Drying Shrinkage, Autogenous Shrinkage and Carbonation Shrinkage.

Plastic shrinkage occurs in the hours that follow the placing of concrete and while concrete is still in its plastic stage. Excessive bleeding water, unstable air and excessive surface drying are possible causes of such shrinkage.

Once hardened, drying shrinkage may occur due to water evaporation. In this situation, upon evaporation of the remaining free water in capillaries and pores and depending on the pore size distribution and structure, the capillaries and pores collapse due to the high capillary pressure. This in turn induces a contraction of the concrete volume, especially when there is a high proportion of pores of less than 50 nm diameter.

Autogenous shrinkage can occur in a conservative system, i.e. where no moisture movement to or from the paste is permitted and where no water loss is occurring therefore. In practice, this can occur in concrete structures where the water cement ratio is low.

Carbon dioxide present in the atmosphere reacts in the presence of water with calcium hydroxide to form calcium carbonate. Such a reaction of calcium hydroxide in hydrated cements is chemically possible even with the low pressure of carbon dioxide in normal atmosphere. Carbonation penetrates beyond the exposed surface of concrete very slowly and the rate of penetration of carbon dioxide depends also on the moisture content of the concrete and the relative humidity of the ambient medium. Carbonation is accompanied by an increase in weight of the concrete and by volumetric change.

Of all types of shrinkage mechanisms and in most common environments, plastic and drying shrinkage have the strongest effect on volumetric changes of concrete. These changes cause increased levels of internal mechanical stress that result in the formation of concrete cracks that reduce strength and durability of the concrete structure. Special precautions need to be taken at job sites and joints at regular intervals must be made in concrete floors and slabs.

The use of expanding agents and shrinkage reducing chemical admixtures is known. Expanding agents are used to generate expansion from the moment when the concrete initially sets and during the first few days of the curing process. These agents are mostly powders of calcium or magnesium oxide. This initial expansion can then more or less compensate the future shrinkage of hardened concrete. Using this kind of products may induce excessive expansion during the first days after the concrete has set, and concrete structures can be subjected to high levels of internal mechanical forces. If the hardened concrete does not have space to expand, the concrete structure may undergo irreversible damage. This is especially the case for concrete slabs and floors.

Chemical shrinkage reducing admixtures are commonly used to mitigate drying shrinkage of concrete. They are in most cases a liquid mixture of surfactants and glycols. Their mechanism of action relies on the reduction of the surface tension and capillary forces upon free water evaporation in the pores of less than 50 nm diameter. These chemical admixtures do not cause the concrete to expand, nor prevent it from shrinking: they reduce the extent of shrinkage.

In practice, controlling the volumetric changes of concrete requires an adjustment of the dosage of the expanding agent and of the shrinkage reducing admixture. Furthermore, most expanding agents react quickly upon addition of water and the reactions that cause the concrete to expand actually start before the concrete sets. Because of the plasticity of concrete during this phase, these expansion reactions do not have a significant impact on the final volume changes of hardened concrete. In this situation the expanding agent may be overdosed, and because these expansion reactions are exothermic, the concrete can generate excessive heat in its early stage. This may lead to several other problems, such as loss of slump retention or in the worst cases thermal cracking of concrete.

It is a purpose of this invention to minimize volumetric changes in concrete throughout its lifetime, and therefore strongly reduce the occurrence of crack formation. Further, it is an object of this invention to solve the above mentioned problems connected with the use of highly reactive expanding agents.

To solve these and other objectives, the invention is characterized in that the expanding agent is calcium oxide having a low and/or delayed reactivity such that the concrete does not expand by more than 0.05 vol.-%, preferably not more than 0.03 vol.-%, during the first 10 days, preferably during the first 7 days, after having been casted. By using a calcium oxide having a low and/or delayed reactivity as the expanding agent in combination with a shrinkage reducing agent, one can take advantage of the known effect that the initial expansion induced by the expanding agent can compensate the future shrinkage of hardened concrete, but at the same time the drawbacks caused by the excessive and fast expansion of the expanding agent, namely the occurrence of high levels of internal mechanical forces and of heat, can be minimized. In particular, the use of a calcium oxide having a low and/or delayed reactivity results in that heat and expansion develop gradually rather than abruptly. In the context of the invention, calcium oxide will be considered to have a low/delayed reactivity, if the concrete does not expand by more than 0.05 vol.-%, preferably not more than 0.03 vol.-%, during the first 10 days, preferably during the first 7 days after having been casted.

The reduced reaction rate of the calcium oxide used in the invention can generally be achieved by selecting calcium oxide having an increased crystallite size, an increase of the pore size and an increase of the specific surface. The pore size and the specific surface may be influenced by the calcining temperature and the calcining time.

In particular, the reactivity of the calcium oxide to be used in the invention may be characterized by a specific particle size distribution, a specific dissolution rate and/or a specific heat of hydration.

Preferably, the calcium oxide has a particle size distribution characterized by a residue of at least 6 wt.-% on a 45 μm mesh sieve.

With regard to the dissolution rate of the calcium oxide, this may be determined by measuring the conductivity of an aqueous solution of calcium oxide. Preferably, the calcium oxide has a reactivity that is characterized by a conductivity of <11 mS/cm when dissolved in water. In order to determine, whether a specific calcium oxide fulfills said criteria, the following test procedure is defined:
  A glass beaker is filled with 45 mL water at a temperature of 20° C.,
  A stirrer is used at a stirring velocity of 450 rpm,
  Conductivity is initially measured,
  1.5 g of calcium oxide is quickly added with a small spoon,
  Conductivity is measured as a function of time until it stabilizes.

The heat released during exothermic reactions is another indicator of the suitability of a source of calcium oxide for the invention. With regard to the heat of hydration, a calcium oxide is considered to be suitable for use in the invention according to a preferred embodiment, if it has a reactivity that is characterized by an average temperature increase of <0.5° C./min during the first 15 minutes after the addition of the calcium oxide into water.

Alternatively, the calcium oxide preferably has a reactivity that is characterized by a temperature increase of <10° C. during the first 5 minutes after the addition of the calcium oxide into water.

To assess the heat of hydration of the expanding agent, the following procedure is defined:
  A glass beaker is filled with 200 mL water at a temperature of 20° C.,
  A stirrer is used at a stirring velocity of 450 rpm,
  Temperature is initially measured,
  20 g of calcium oxide are quickly added with a small spoon,
  The temperature is recorded as a function of time until it starts to decline.

The use of a calcium oxide having a low and/or delayed reactivity with conventional shrinkage reducing agents as mentioned above allows the production of a concrete composition that has substantially no volume change after 365 days when compared to the initial volume. In particular, the volume change of the concrete is between +0.01 and −0.01 vol.-% after 365 days after having been casted, measured in accordance with ASTM C878. With such small volumetric changes, the occurrence of concrete cracks is cancelled out.

According to a preferred embodiment of the invention the hydraulic binder comprises ordinary Portland cement and optionally supplementary cementitious material, such as granulated blast furnace slag, fly ash, pozzolans or mixtures thereof.

In the context of the invention, commonly used shrinkage reducing admixtures may be used. Preferably, the shrinkage reducing admixture is an organic admixture, in particular based on polypropylene glycol, polyethylene glycol and/or a glycol ether derivative, preferably in a liquid mixture with surfactants.

In a preferred embodiment, the low reactive expanding agent, namely calcium oxide, is integrated in the cement manufacturing process and is a cement component, and the shrinkage reducing agent is added during the cement manufacturing process or the fabrication of the concrete.

In order to improve the workability of the concrete mass, the mixture may preferably comprise a water reducing agent, in particular a polycarboxylate ether based or a polynaphthalene sulfonate based plasticizing admixture, the water reducing agent preferably being present in an amount of 20-60 mL/100 kg hydraulic binder. Plasticizing admixtures are sometimes also referred to as dispersing agents or flow agents and are deployed in order to improve workability with regard to flowability. Such admixtures are long chained organic molecules, that group around the cement particles and thus either bring about electrostatic repulsion between the particles or steric stabilisation of the particles, thereby increasing flowability of the building material.

The optimal dosage of the expanding agent and of the shrinkage reducing admixture can be determined by the person skilled in the art with a view to minimizing the overall volumetric change of the concrete. According to a preferred embodiment of the invention, the amounts of expanding agent and shrinkage reducing admixture are selected so that the volume change of the concrete is between +0.01 and −0.01 vol.-% after 365 days after having been casted.

Particularly, the expanding agent is present in an amount of 2-6 wt.-%, preferably 3-5 wt.-% of the hydraulic binder.

In particular, a reduced dosage of the expanding agent in the ranges indicated above may be sufficient due to its reduced/delayed reactivity. Expanding agents start to react as soon as they are in contact with water. Because of the plasticity of concrete before it actually sets, all expansion reactions that occur before the concrete is hard do not serve the inventive purpose. CaO having a lower/delayed reactivity develops a reduced expansion at early stages and suitable expansion at later stages.

Advantageously, the shrinkage reducing admixture is present in an amount of 1-2 wt.-% of the hydraulic binder.

Further, the water/binder ratio may preferably be selected to be 0.15-0.50, preferably 0.25-0.45.

According to a preferred embodiment of the invention, the hydraulic binder is present in an amount of 280-700 kg, preferably 300-600 kg per cubic meter of concrete.

According to a further aspect of the invention, a hydraulic binder composition for producing a very low-shrinkage concrete is provided, comprising ordinary Portland cement, optionally a supplementary cementitious material and an expanding agent, wherein the expanding agent is calcium oxide, wherein
  the calcium oxide has a particle size distribution characterized by a residue of at least 6 wt.-% on a 45 μm mesh sieve, and/or
  the calcium oxide has a reactivity that is characterized by a conductivity of <11 mS/cm when dissolved in water, and/or the calcium oxide has a reactivity that is characterized by an average temperature increase of <0.5° C./min during the first 15 minutes after the addition of the calcium oxide into water, and/or the calcium oxide has a reactivity that is characterized by a temperature increase of <10° C. during the first 5 minutes after the addition of the calcium oxide into water.

According to a further aspect the invention refers to the use of calcium oxide as an expanding agent for producing a very low-shrinkage concrete, wherein the calcium oxide has a particle size distribution characterized by a residue of at least 6 wt.-% on a 45 μm mesh sieve, and/or the calcium oxide has a reactivity that is characterized by a conductivity of <11 mS/cm when dissolved in water, and/or the calcium oxide has a reactivity that is characterized by an average temperature increase of <0.5° C./min during the first 15 minutes after the addition of the calcium oxide into water, and/or the calcium oxide has a reactivity that is characterized by a temperature increase of <10° C. during the first 5 minutes after the addition of the calcium oxide into water.

The invention will now be described with reference to the following exemplary embodiments.

EXAMPLE 1

Concrete was mixed in four different mix designs. In order to determine, which type of calcium oxide is suitable for use in the mix designs, the following tests have been performed.

Two different types of calcium oxide were tested with regard to their dissolution rate. To this aim, the conductivity of two dispersions of diluted calcium oxide was tested. The following test procedure was followed:

A glass beaker is filled with 45 mL water at a temperature of 20° C.,

A stirrer was used at a stirring velocity of 450 rpm,

Conductivity was initially measured, 1.5 g of calcium oxide was quickly added with a small spoon, Conductivity was measured as a function of time until it stabilizes.

The results of the test are shown in FIG. 1. As can be gathered from FIG. 1 the conductivity values in both cases are always below 11 mS/cm, which make both sources suitable for the inventive use.

In another test, calcium oxides of four other sources were tested with regard to their heat of hydration. The following test procedure was used:

A glass beaker is filled with 200 mL water at a temperature of 20° C.,

A stirrer was used at a stirring velocity of 450 rpm,

Conductivity was initially measured, 1.5 g of calcium oxide was quickly added with a small spoon, Conductivity was measured as a function of time until it stabilizes.

Figure 2:
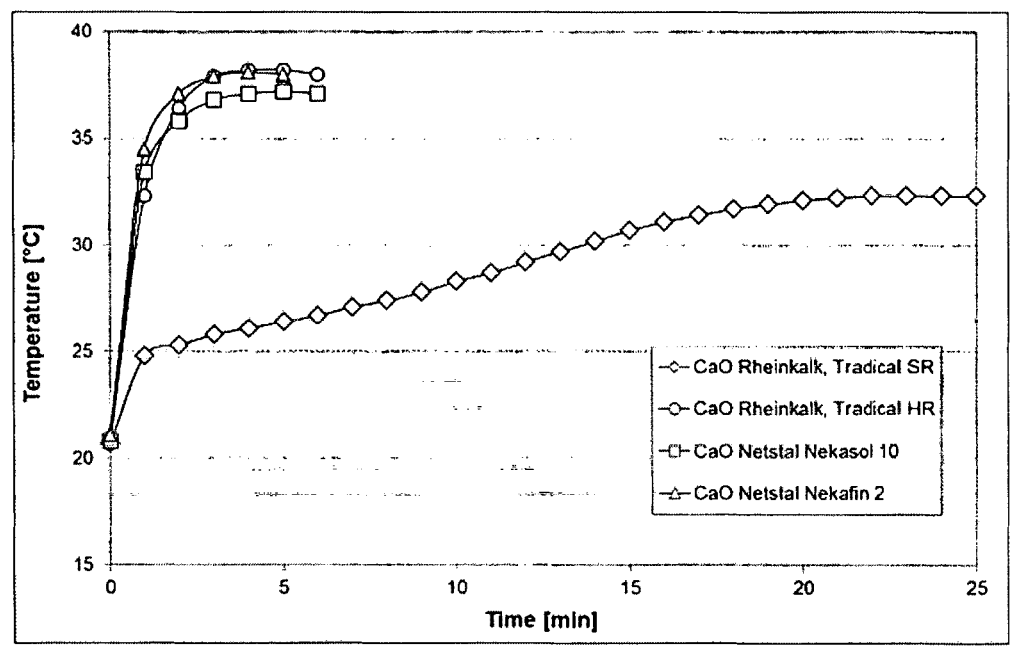

As shown in FIG. 2, the sources of calcium oxide have two distinct behaviors. In the first series, the heat of hydration is high and causes a temperature increase of the dispersion of more than 15° C. in less than 5 minutes. The product Tradical SR from Rheinkalk has a lower heat of hydration, characterized by a maximum temperature increase of +12° C., and the average temperature increase is less than +0.5° C. per minute between 1 and 15 minutes. This latter source of calcium oxide is a preferred expanding agent within the scope of the invention.

Subsequently, concrete was mixed in four different mix designs according to Table 1.

TABLE 1

| Mix # | Binder kg/m$^3$ | w/B | Slag wt-% | Aggregate Combination Sand, % | GR-20, % | Lim-40, % | SRA wt-% | CaO wt-% | Water reducer mL/100 kg binder |
|---|---|---|---|---|---|---|---|---|---|
| 1 | 350 | 0.47 | 25 | 48 | 32 | 20 | 1.5 | 5.0 | 60 |
| 2 | 350 | 0.47 | 25 | 48 | 32 | 20 | 2.0 | 3.0 | 25 |
| 3 | 350 | 0.47 | 25 | 48 | 32 | 20 | 1.0 | 3.0 | 35 |
| 4 | 350 | 0.47 | 25 | 48 | 32 | 20 | 0.0 | 5.0 | 104 |

In Table 1, "w/B" means water/binder ratio, "SRA" means shrinkage reducing admixture, "GR-20" means 20 mm natural gravel and "Lim-40" means 40 mm crushed limestone gravel. The amounts given in the column "Binder" represent the total amount of hydraulic binder, including Portland cement and granulated blast furnace slag. The slag content of the binder is indicated in the column "Slag".

As a water reducer the product "Plastol 341" produced by The Euclid Chemical Company is used. Plastol 341 is a polycarboxylate based plasticizing admixture.

SRA Floor supplied by Euclid Chemicals was used as shrinkage reducing agent.

Any of the calcium oxides that have been identified as suitable in the conductivity test and/or the heat of hydration test as described above may be used in the example.

The concrete compositions with the mix designs described in Table 1 were used to produce test blocks, which were cured and several parameters were measured as indicated in Table 2.

TABLE 2

| | Plastic Performance | | | | | Compressive Strength | |
|---|---|---|---|---|---|---|---|
| Mix # | Ambient ° C. | Concrete ° C. | Slump mm | Air Content % | Density kg/m$^3$ | 7 d MPa | 28 d MPa |
| 1 | 21.9 | 22.9 | 120 | 2.6 | 2417 | 33.0 | 43.8 |
| 2 | 21.9 | 23.6 | 130 | 4.0 | 2368 | 34.0 | 45.1 |
| 3 | 21.4 | 22.8 | 125 | 2.5 | 2405 | 36.0 | 48.2 |
| 4 | 21.5 | 23.1 | 115 | 2.4 | 2444 | 39.6 | 51.2 |

Further, the volumetric change of the cured concrete was measured, as indicated in Table 3.

TABLE 3

| | Concrete Shrinkage/Expansion (%, ASTM C 878/878M-09) | | | | | | | | | | | |
|---|---|---|---|---|---|---|---|---|---|---|---|---|
| | Cured in water | | | Cured in drying chamber | | | | | | | | |
| Mix # | 1 d | 4 d | 7 d | 1 d | 4 d | 7 d | 14 d | 21 d | 28 d | 56 d | 91 d | 126 d |
| 1 | 0.030 | 0.035 | 0.035 | 0.031 | 0.029 | 0.027 | 0.025 | 0.022 | 0.021 | 0.014 | 0.014 | 0.010 |
| 2 | 0.022 | 0.027 | 0.025 | 0.025 | 0.023 | 0.021 | 0.018 | 0.018 | 0.017 | 0.010 | 0.008 | 0.006 |
| 3 | 0.024 | 0.029 | 0.030 | 0.028 | 0.025 | 0.023 | 0.021 | 0.021 | 0.018 | 0.012 | 0.006 | 0.005 |
| 4 | 0.050 | 0.053 | 0.055 | 0.049 | 0.045 | 0.041 | 0.036 | 0.035 | 0.030 | 0.021 | 0.021 | 0.014 |

Figure 3:
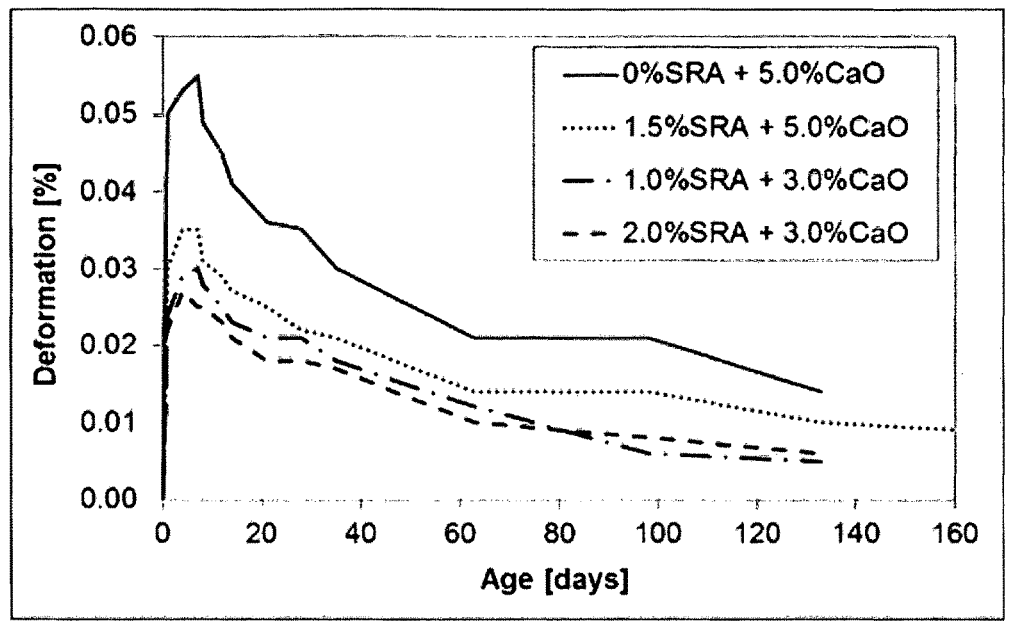

Graphs of the volumetric change data are represented in FIG. 3. As can be seen from Table 3 and FIG. 3, the final volumetric change after 126 days is 0.01 vol.-% or below for mix designs Nos. 1, 2 and 3, in which a shrinkage reducing agent as well as a calcium oxide having a low reactivity have been used. In mix design No. 4 no shrinkage reducing agent was used at all. This evidences the synergistic effects of the combined use of the shrinkage reducing agent and the calcium oxide having a low reactivity.

EXAMPLE 2

In a further example, ultra-performance concrete was mixed in two different mix designs according to Table 4. Mix #2 is a mix design according to the invention, whereas mix #1 is a conventional mix design without the use of CaO and without shrinkage reducing agent.

TABLE 4

| Mix # | Binder kg/m³ | W/B | Water reducer wt-% | Steel fibers kg/m³ | CaO wt-% | SRA wt-% |
|---|---|---|---|---|---|---|
| 1 | 700 | 0.15 | 3.4 | 303 | 0 | 0 |
| 2 | 700 | 0.15 | 3.4 | 303 | 3.0 | 1.0 |

In Table 4, "W/B" means water/binder ratio and "SRA" means shrinkage reducing admixture.

As a water reducer the product Sika Viscocrete P5 produced by Sika is used.

The steel fibers are Dramix OL 13/0.20.

SRA Floor supplied by Euclid Chemicals was used as shrinkage reducing agent. Any other convention shrinkage reducing agent may also be used.

Any of the calcium oxides that have been identified as suitable in the conductivity test and/or the heat of hydration test as described in Example 1 may be used in this example.

The concrete compositions with the mix designs described in Table 4 were used to produce test blocks, which were cured and several parameters were measured as indicated in Table 5.

TABLE 5

| | Plastic Performance | | | | Compressive strength | | | |
|---|---|---|---|---|---|---|---|---|
| | Flow at | | | | | | | |
| Mix # | Flow mm | 30 min mm | Air Vol.-% | Density kg/m³ | 1 d | 7 d | 28 d | 56 d |
| | | | | | MPa | | | |
| 1 | 53 | 42 | 2.1 | 2400 | 11.7 | 31.3 | 37.1 | 40.4 |
| 2 | 46 | 41 | 1.6 | 2441 | 12.7 | 31.6 | 38 | 435 |

Figure 4:
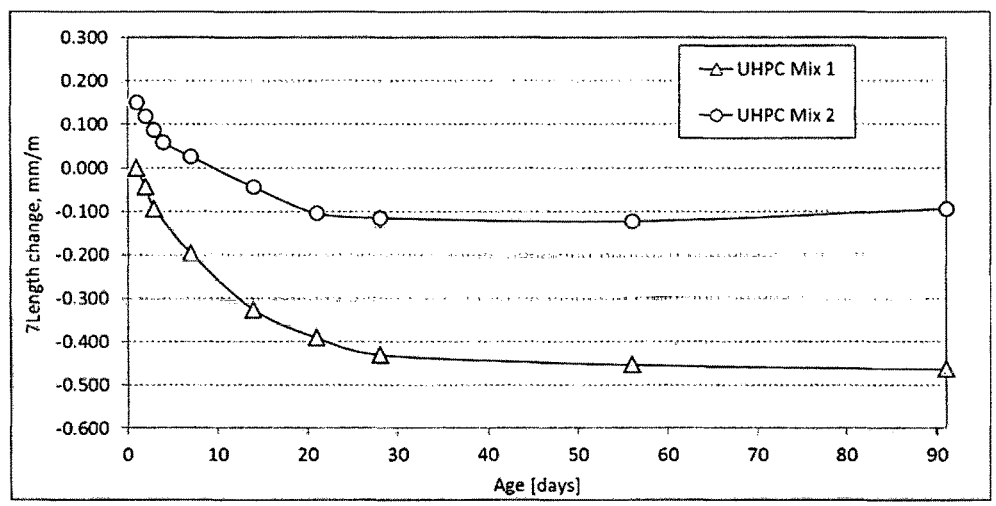

As can be seen in the shrinkage values represented in FIG. 4, the mix design #2 according to the invention features a considerable lower shrinkage than mix design #1.

The invention claimed is:

1. A concrete composition that is
(a) a concrete composition comprising, in a mixture with water, a hydraulic binder, sand, aggregates, an expanding agent, and a shrinkage reducing admixture, wherein the expanding agent is calcium oxide having a low reactivity wherein the concrete does not expand by more than 0.05 vol. %, during the first 10 days, after having been casted; or
(b) a concrete composition comprising, in a mixture with water, a hydraulic binder, sand, aggregates, an expanding agent, and a shrinkage reducing admixture, wherein the expanding agent is calcium oxide having a low reactivity wherein the concrete does not expand by more than 0.05 vol. %, during the first 7 days, after having been casted,
wherein the concrete composition of (a) and the concrete composition of (b) satisfy at least one of the following:
(i) the calcium oxide has a reactivity that is characterized by a conductivity of <11 mS/cm when dissolved in water,
(ii) the calcium oxide has a reactivity that is characterized by an average temperature increase of <0.5° C./min during the first 15 minutes after the addition of the calcium oxide into water, or
(iii) the calcium oxide has a reactivity that is characterized by a temperature increase of <10° C. during the first 5 minutes after the addition of the calcium oxide into water.

2. The concrete composition according to claim 1, wherein the calcium oxide has a particle size distribution characterized by a residue of at least 6 wt. % on a 45 μm mesh sieve.

3. The concrete composition according to claim 1, wherein the hydraulic binder comprises ordinary Portland cement and optionally supplementary cementitious material.

4. The concrete composition according to claim 1, wherein the shrinkage reducing admixture is an organic admixture.

5. The concrete composition according to claim 1, wherein the mixture further comprises a water reducing agent in an amount of 20-60 ml/100 kg hydraulic binder.

6. The concrete composition according to claim 1, wherein the volume change of the concrete is between +0.01 and −0.01 vol. % after 365 days after having been casted.

7. The concrete composition according to claim 1, wherein the concrete composition contains the expanding agent in an amount of 2-6 wt. % of the hydraulic binder.

8. The concrete composition according to claim 1, wherein the concrete composition contains the shrinkage reducing admixture in an amount of 1-2 wt. % of the hydraulic binder.

9. The concrete composition according to claim 1, wherein the concrete composition has a water/binder ratio is 0.15-0.50.

10. The concrete composition according to claim 1, wherein the hydraulic binder is present in an amount of 280-700 kg per cubic meter of concrete.

11. A construction element comprising concrete obtained from a concrete composition according to claim 1.

12. The concrete composition according to claim 1, wherein
when the concrete composition is (a), the expanding agent is calcium oxide having a low reactivity, and wherein the concrete does not expand by more than 0.03 vol. % during the first 10 days; or
when the concrete composition is (b), the expanding agent is calcium oxide having a low reactivity, and wherein the concrete does not expand by more than 0.03 vol. % during the first 7 days.

13. The concrete composition according to claim 3, wherein the optionally supplementary cementitious material comprises granulated blast furnace slag, fly ash, pozzolans or mixtures thereof.

14. The concrete composition according to claim 5, wherein the water reducing agent comprises a polycarbonate ether based plasticizer admixture or a polynaphthalene sulfonate based plasticizing admixture.

15. The concrete composition according to claim 4, wherein the shrinkage reducing admixture is an organic admixture based on polypropylene glycol, polyethylene glycol and/or a glycol ether derivative, optionally in a liquid mixture with surfactants.

16. The concrete composition according to claim 1, wherein the concrete composition of (a) satisfies (i), (ii) and (iii).

17. The concrete composition according to claim 1, wherein the concrete composition of (b) satisfies (i), (ii) and (iii).

* * * * *